United States Patent
Wright

(10) Patent No.: US 7,912,001 B2
(45) Date of Patent: Mar. 22, 2011

(54) METHODS, SYSTEMS, AND PRODUCTS FOR A METERING APPLICATION

(75) Inventor: Steven Wright, Roswell, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1328 days.

(21) Appl. No.: 11/100,736

(22) Filed: Apr. 7, 2005

(65) Prior Publication Data
US 2005/0198682 A1 Sep. 8, 2005

Related U.S. Application Data

(63) Continuation-in-part of application No. 10/719,270, filed on Nov. 21, 2003, application No. 11/100,736, filed on Apr. 7, 2005.

(60) Provisional application No. 60/470,650, filed on May 15, 2003, provisional application No. 60/602,147, filed on Aug. 17, 2004.

(51) Int. Cl.
*H04Q 7/00* (2006.01)

(52) U.S. Cl. .................. 370/329; 370/486; 345/619

(58) Field of Classification Search .......... 370/229–235, 370/312–444
See application file for complete search history.

(56) References Cited

U.S. PATENT DOCUMENTS

| | | | |
|---|---|---|---|
| 5,359,593 A | 10/1994 | Derby | |
| 5,978,363 A | 11/1999 | Dimitrijevic | |
| 6,061,562 A | 5/2000 | Martin | |
| 6,104,700 A | 8/2000 | Haddock | |
| 6,240,073 B1 | 5/2001 | Reichman | |
| 6,324,184 B1 | 11/2001 | Hou | |
| 6,483,805 B1 | 11/2002 | Davies | |
| 6,519,062 B1 | 2/2003 | Yoo | |
| 6,553,568 B1 * | 4/2003 | Fijolek et al. ................ | 725/111 |
| 6,594,268 B1 | 7/2003 | Aukia | |
| 6,601,082 B1 | 7/2003 | Durham | |
| 6,611,872 B1 | 8/2003 | McCanne | |
| 6,621,793 B2 | 9/2003 | Widegren | |
| 6,640,239 B1 | 10/2003 | Gidwani | |
| 6,684,244 B1 | 1/2004 | Goldman | |
| 6,693,896 B1 | 2/2004 | Utsumi | |
| 6,711,710 B2 | 3/2004 | Jiang | |
| 6,728,239 B1 | 4/2004 | Kung | |
| 6,738,348 B1 | 5/2004 | Rollins | |
| 6,754,197 B1 * | 6/2004 | Davidson et al. ............. | 370/338 |
| 6,775,273 B1 | 8/2004 | Kung | |
| 6,804,492 B2 | 10/2004 | Kay | |
| 6,820,117 B1 * | 11/2004 | Johnson ........................ | 709/223 |
| 6,822,940 B1 | 11/2004 | Zavalkovsky | |
| 6,947,723 B1 * | 9/2005 | Gurnani et al. ............... | 455/406 |
| 7,117,172 B1 * | 10/2006 | Black .............................. | 705/35 |
| 7,389,537 B1 * | 6/2008 | Callon et al. .................... | 726/22 |
| 7,460,536 B1 * | 12/2008 | Williams et al. ............. | 370/392 |
| 2002/0009060 A1 | 1/2002 | Gross | |

(Continued)

*Primary Examiner* — Seema S Rao
*Assistant Examiner* — Wanda Z Russell
(74) *Attorney, Agent, or Firm* — Cantor Colburn LLP

(57) ABSTRACT

Methods, systems, and products are disclosed for enforcing a rate limit for data traffic. One method identifies a unidirectional stream of data packets flowing though a server to a downstream end user. The unidirectional stream is classified according to a rate class, with each rate class having an associated rate limit. Each rate limit specifies a maximum bit rate at which the unidirectional stream may flow. When the actual bit rate of the unidirectional stream exceeds the maximum bit rate permitted for the associated rate class, packets of data are discarded to reduce the bit rate.

14 Claims, 14 Drawing Sheets

U.S. PATENT DOCUMENTS

| | | |
|---|---|---|
| 2002/0059630 A1 | 5/2002 | Salo |
| 2003/0095560 A1 | 5/2003 | Arita |
| 2003/0139134 A1 | 7/2003 | Bailey |
| 2003/0236854 A1 | 12/2003 | Rom |
| 2004/0196848 A1 | 10/2004 | Wang |
| 2004/0208125 A1* | 10/2004 | Damon et al. ................ 370/235 |
| 2004/0228354 A1 | 11/2004 | Anschutz |
| 2004/0228363 A1 | 11/2004 | Adamczyk |
| 2004/0252698 A1 | 12/2004 | Anschutz |

* cited by examiner

METHODS, SYSTEMS, AND PRODUCTS FOR A METERING APPLICATION

CROSS-REFERENCE TO RELATED APPLICATIONS

This application claims benefit under 35 U.S.C. §119 (e) of U.S. Provisional Application No. 60/602,147, filed Aug. 17, 2004, which is incorporated herein by reference in its entirety. This application is also a continuation-in-part of U.S. application Ser. No. 10/719,270, filed Nov. 21, 2003, which claims benefit under 35 U.S.C. §119 (e) of U.S. Provisional Application No. 60/470,650, filed May 15, 2003, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to electrical computers and digital processing systems, to interactive video distribution systems, and to multiplex communications. This application, more particularly, relates to computer-to-computer protocol implementing, to computer network managing, to computer-to-computer data routing, to a video distribution system with upstream communication, and to pathfinding or routing.

Communications network service providers need bandwidth and quality of service configuration options. As more and more customers desire greater access to broadband services, service providers need network configuration options that can be customized on a per-subscriber and a per-application level. These configuration options would make the network more manageable by allowing dynamic bandwidth and quality of service determinations. What is needed, then, are schemes that dynamically adjust bandwidth and quality of service to reflect the dynamic needs of the communications network.

SUMMARY

The aforementioned problems, and other problems, are reduced, according to the exemplary embodiments, by a metering application. This metering application is a network management tool that dynamically adjusts bandwidth on a per-customer level. This metering application comprises methods, computer systems, and computer products that enforce a rate limit for data traffic. The data traffic may include any packetized stream of data, such as video, images, voice (e.g., Voice-Over Internet Protocol), Internet Protocol television, and any other packetized data. The metering application identifies a stream of data packets flowing though a server to a downstream end user. The metering application classifies the unidirectional stream according to a rate class, with each rate class having an associated rate limit. Each rate limit specifies a maximum bit rate at which the unidirectional stream may flow through the server. The end-user customer typically subscribes to a class of service. Each class of service has an associated maximum bit rate at which streams of data may flow downstream to the end-user customer. If the customer subscribes to a class of service having a high rate limit, the customer can receive/download data at high bit rates. If, however, the customer subscribes to a class of service having a low rate limit, the customer can only receive/download data at low bit rates. The metering application, then, polices and enforces the rate limit. When the customer requests a stream of data having an actual bit rate that exceeds the maximum bit rate permitted for the customer's rate class, the metering application decides whether the rate limit must be enforced. If the metering application enforces the rate limit, the metering application will discard packets of data to reduce the bit rate of the requested stream.

According to the exemplary embodiments, methods, systems, and products are disclosed for enforcing a rate limit for data traffic. One method identifies a unidirectional stream of data packets flowing though a server to a downstream end user. The unidirectional stream is classified according to a rate class, with each rate class having an associated rate limit. Each rate limit specifies a maximum bit rate at which the unidirectional stream may flow through the server. When the actual bit rate of the unidirectional stream exceeds the maximum bit rate permitted for the associated rate class, packets of data are discarded to reduce the bit rate.

Other embodiments describe a system for system for enforcing a rate limit for data traffic. This system comprises a metering application stored in a memory device. The system also comprises a processor, and the processor communicates with the memory device. The metering application identifies a unidirectional stream of data packets flowing though the system to a downstream end user. The metering application classifies the unidirectional stream of data packets according to a rate class. Each rate class has an associated rate limit, with each rate limit specifying a maximum bit rate at which the unidirectional stream may flow through the system. The metering application discards packets of data within the unidirectional stream of data packets to reduce a bit rate until the bit rate is less than or equal to the maximum bit rate permitted for the associated rate class.

Still more embodiments describe a computer program product for enforcing a rate limit for data traffic. The computer program product comprises a computer-readable medium and a metering application stored on the computer-readable medium. The metering application comprises computer-readable instructions for enforcing a rate limit for data traffic. The computer-readable instructions identify a unidirectional stream of data packets flowing though a server to a downstream end user. The unidirectional stream is classified according to a rate class, with each rate class having an associated rate limit. Each rate limit specifies a maximum bit rate at which the unidirectional stream may flow through the server. When the actual bit rate of the unidirectional stream exceeds the maximum bit rate permitted for the associated rate class, packets of data are discarded to reduce the bit rate.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments are better understood when the following Detailed Description is read with reference to the accompanying drawings, wherein.

DETAILED DESCRIPTION

Figure 1:
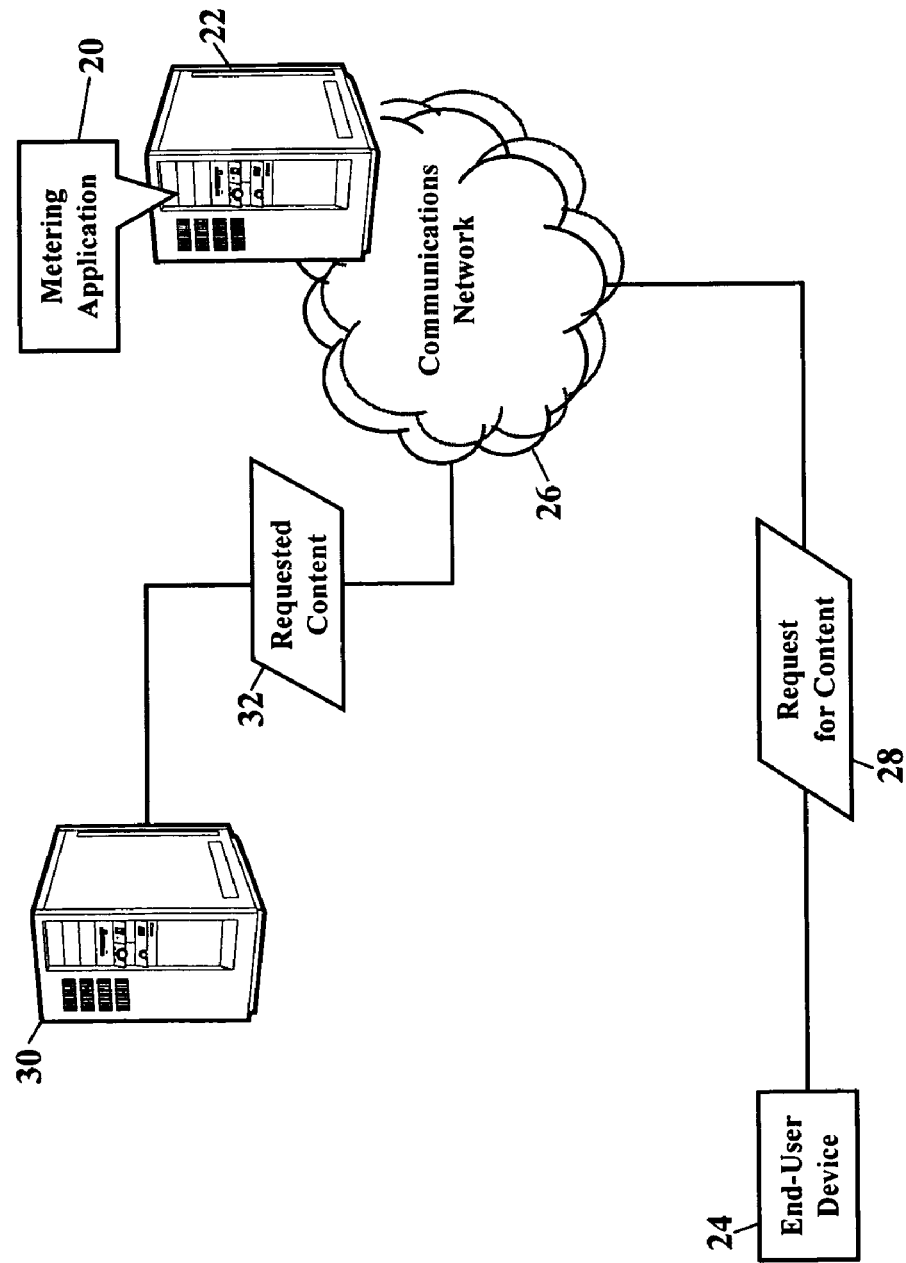
FIGS. 1-3 are schematics illustrating the exemplary embodiments.

Exemplary embodiments will now be described more fully hereinafter with reference to the accompanying drawings, in which exemplary embodiments are shown. The exemplary embodiments, however, may be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The exemplary embodiments describe a metering application. This metering application is a network management tool that dynamically adjusts bandwidth on a per-customer level. This metering application comprises methods, computer systems, and computer products that enforce a rate limit for data traffic. The metering application identifies a stream of data packets flowing though a server to a downstream end user. The metering application classifies the unidirectional stream according to a rate class, with each rate class having an associated rate limit. Each rate limit specifies a maximum bit rate at which the unidirectional stream may flow through the server. The end-user customer typically subscribes to a class of service. Each class of service has an associated maximum bit rate at which streams of data may flow downstream to the end-user customer. If the customer subscribes to a class of service having a high rate limit, the customer can receive/download data at high bit rates. If, however, the customer subscribes to a class of service having a low rate limit, the customer can only receive/download data at low bit rates. The metering application, then, polices and enforces the rate limit. When the customer requests a stream of data having an actual bit rate that exceeds the maximum bit rate permitted for the customer's rate class, the metering application decides whether the rate limit must be enforced. If the metering application enforces the rate limit, the metering application will discard packets of data to reduce the bit rate of the requested stream.

Figure 2:
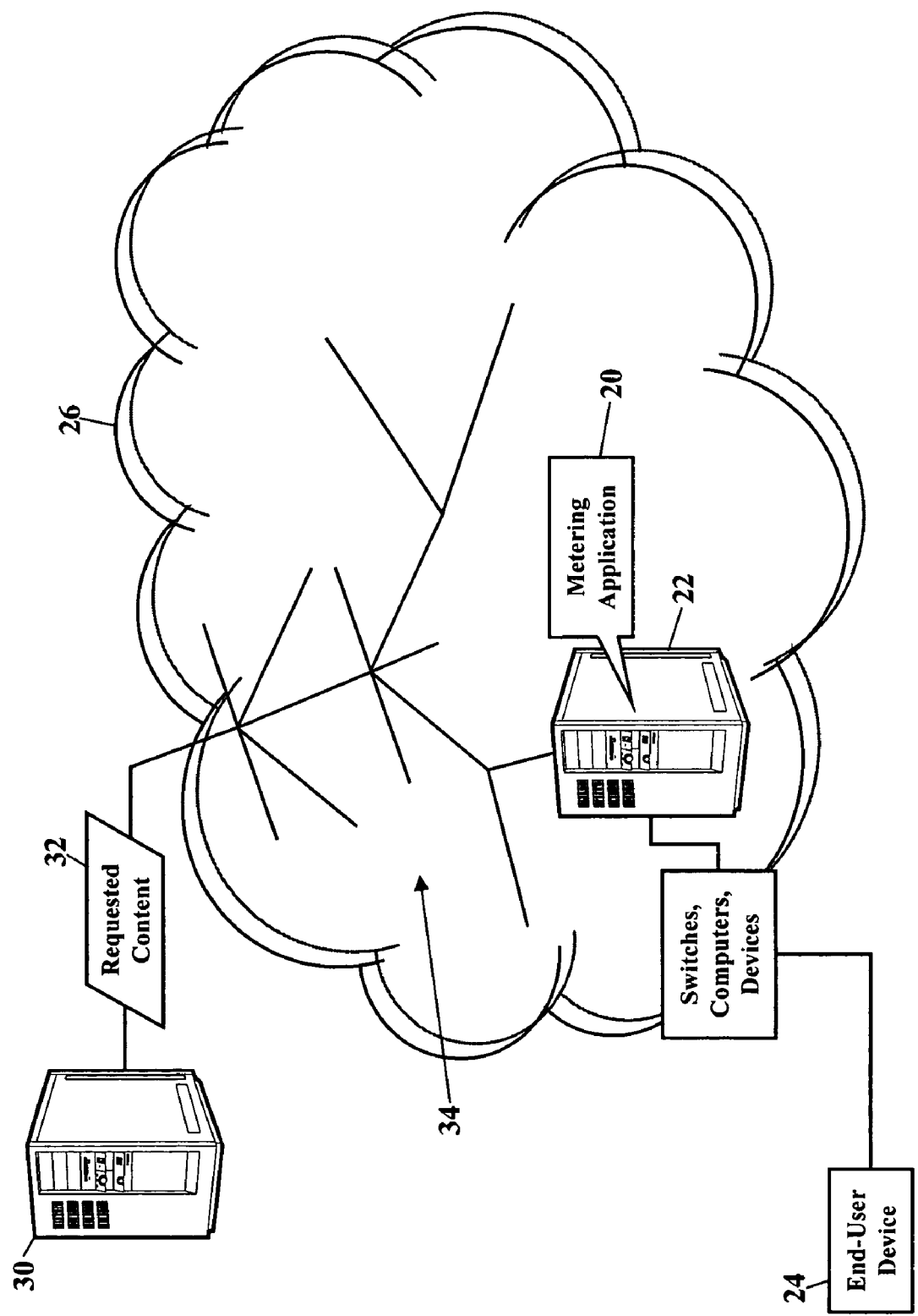
Figure 3:
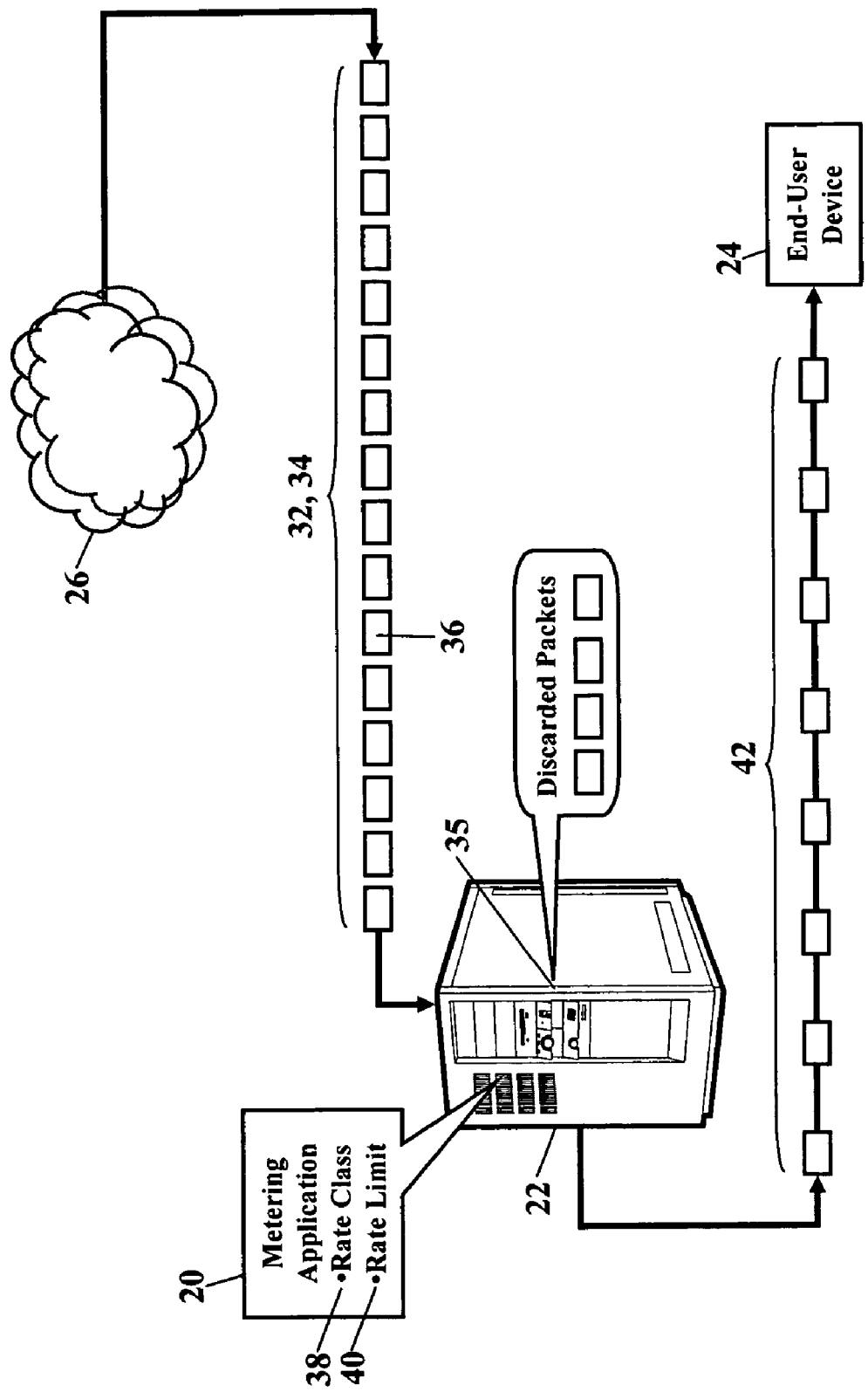

FIGS. 1-3 are schematics illustrating the exemplary embodiments. The embodiments include a metering application 20. The metering application 20 comprises methods, systems, computer programs, and/or computer program products that police and enforce rate limits for streams of data. Streams of data travel or flow along a communications network at a bit rate. The bit rate is usually measured in bits per second, although other units are equally possible. To ensure that network bandwidth is efficiently utilized, the metering application 20 prevents some streams of data from exceeding a maximum bit rate. When a stream exceeds the maximum bit rate, the metering application 20 enforces the maximum bit rate. The metering application 20, in simple terms, acts as a police officer. When a stream of data exceeds the maximum bit rate, or "speed limit," the metering application 20 implements schemes that slow or reduce the bit rate. The following paragraphs will explain the various schemes.

FIG. 1 illustrates the metering application 20. The metering application 20 operates within any computer system, such as a computer server 22. The computer server 22 communicates with a downstream end-user device 24 via a communications network 26. Although the end-user device 24 is generically shown, the end-user device 24 may be a computer system, a set-top box, an integrated set-top box and television, a modem, a cable modem, a digital subscriber line modem, or any other equipment, as will be described. The end-user device 24 could also be fiber optic equipment interfacing with the communications network 26. The communications network 26 may be a cable network operating in the radio-frequency domain and/or the Internet Protocol (IP) domain. The communications network 26, however, may also include a distributed computing network, such as the Internet (sometimes alternatively known as the "World Wide Web"), an intranet, a local-area network (LAN), and/or a wide-area network (WAN). The communications network 26 may include coaxial cables, copper wires, fiber optic lines, and/or hybrid-coaxial lines. The communications network 26 may even include wireless portions utilizing any portion of the electromagnetic spectrum and any signaling standard (such as the I.E.E.E. 802 family of standards, GSM/CDMA/TDMA or any cellular standard, and/or the ISM band).

As FIG. 1 illustrates, a request 28 for content is received. The end-user desires to receive a movie, a television channel, music, or other content. The end-user then issues the request 28 for that content via the end-user device 24. The request 28 communicates along the communications network 26 and eventually to a content server 30. The content server 30 stores the content requested by the end-user. The content server 30 retrieves the requested content 32 and forwards that requested content to the end-user.

FIG. 2 illustrates a network tree structure 34. As the requested content 32 communicates along the communications network 26 to the end-user device 24, the requested content 32 encounters the metering application 20 operating in the computer server 22. The computer server 22 receives the requested content 32, and the metering application 20 identifies and classifies the requested content 32. The computer server 22, for example, may function as a router or a broadband remote access server ("BRAS"). Some network architectures utilize the computer server 22 as the last router in a downstream direction to the end-user device 24. The requested content 32 may further flow through other layers of switches, computers, and/or devices, but the computer server 22 is the last intelligent device that classifies data traffic.

FIG. 3 is a schematic illustrating a scheme for enforcing rate limits, according to the exemplary embodiments. As the requested content 32 flows through the computer server 22, the metering application 20 identifies any egressing, unidirectional stream 34 of Internet Protocol television data packets. That is, the metering application 20 identifies streams of Internet Protocol television data packets that are flowing out of the communications network 26 to the end-user device 24. The stream 34 contains individual packets 36 of data, and each packet 36 contains Internet Protocol television information. The metering application 20 classifies the unidirectional stream 34 of Internet Protocol television data packets according to a rate class 38, with each rate class having an associated rate limit 40. Each rate limit 40 specifies a maximum bit rate at which the unidirectional stream 34 of Internet Protocol television data packets may flow.

The metering application 20 polices and enforces the rate limit 40. If the actual bit rate of the unidirectional stream 34 exceeds the rate limit 40, the metering application 20 decides whether to enforce the rate limit 40 (e.g., the "speed limit"). As FIG. 3 shows, the metering application 20, for example, may decide to discard packets of data within the unidirectional stream 34 of Internet Protocol television data packets. When packets are discarded, the bit rate is reduced. The metering application 20 may intentionally discard packets of data until the observed or measured bit rate is less than or equal to the maximum bit rate permitted for the associated rate class. The terms "discard," "discarding," "discarded," and its variants mean packets of data are removed from the stream 34. The terms "discard," "discarding," "discarded," and its variants may also mean, as later explained, that information is removed or stripped from the stream 34. The metering application 20, then, may simply delete packets from the stream 34. The discarded packets may be stored in a buffer memory 35 for later retrieval at a later time. When the metering application 20 discards packets, then a degraded stream 42 of Internet Protocol television data packets exits the computer server 22. Because packets have been discarded, the degraded stream 42 has lesser bandwidth than the stream 34 entering the computer server 22. How many packets that get discarded, and thus how much degradation is imposed, depends on the rate class 38 and the associated rate limit 40.

The end-user may subscribe to a rate class. The end-user and a service provider may contract for a rate class. A service level agreement, for example, would define the service parameters. Typically various charges are established for different classes of service. The more the end-user pays, the higher the rate class and the corresponding rate limit. When the end-user's data requests exceed the rate limit for their rate class, then the metering application 20 degrades the end-user's content to maintain the rate limit. The metering application 20 meters on aggregate traffic rather than a single meter on a single pipe. The metering application 20 permits finer granularity that identifies traffic in particular classes and meters within that class. The metering application 20 then polices bit rates based on the rate limit 40 for classes of traffic.

The rate limit 40, however, is also important for the service provider. In order to make the communications network 26 more manageable, and to make the selections of the ASPs and NSPs more manageable, bandwidth and Quality of Service (QoS) subsets will provided and the overall management of these capabilities will be governed by a policy-based system. This policy-based system permits customization down to the per-subscriber and application flow level.

The metering application 20 permits Bandwidth on Demand (BoD). Bandwidth on Demand is basically the ability to specify and to change the maximum rates for access. BoD may apply to Network Service Providers (NSP). The NSP's access to the communications network 26 can be set to receive various maximum bit rates. These changes affect their entire access session, and so all the applications within the session receive access to the new rate. The NSP could request this for a single subscriber, for all subscribers, or for a pre-defined tier of service. For example, all NSP access subscribers that have elected 256×128 Kb/s service might be provided a "free weekend" of 3 Mb×512 Kb/s in a promotion to entice them to upgrade their service. This weekend change in that service tier is an example of BoD.

ASP applications can be set to receive various maximum bit rates. Similar to the NSP service, but focused on a single application rather than the entire access session, BoD for ASP traffic would support setting both a universal speed limit to all customers as well as customer-specific speed limit for single customers. A "Turbo" feature, such as a Turbo button, is another term often used to describe the capability for both NSP accesses as well as ASP applications to change their maximum bit rates.

The rate class 38, and the associated rate limit 40, may not be a bandwidth guarantee. The rate limit 40 may be just that—a maximum for the service class. If BoD were offered in conjunction with a service class that guaranteed precedence over all other traffic, this precedence would constitute a bandwidth guarantee. Still, though, there is an expectation that the ASP or NSP gains something from the BoD service—even when it applies to best effort Internet. Also, there is an additional expectation that the NSP and ASP can query for a line rate maximum and can query for how much is already "committed" to other traffic. BoD may persist until it is specifically changed again—in other words, BoD may look like a provisioning function. Alternately, BoD may be requested for a specific interval, predefined interval, or until an access session is torn down.

The metering application 20 also permits Quality of Service (QoS). Because the metering application classifies streams of data, any number of classes is possible. The exemplary embodiments will describe three (3) distinct QoS treatment categories, although those of ordinary skill in the art will recognize that more, or less, classes are possible.

The lowest level class is "best effort." That is, traffic in this class receives no treatment. This class is the typical "best effort" Internet service class. Most of the applications are assumed to be part of this class, and most applications will interact as they do today in an otherwise undifferentiated access arrangement.

Another class receives aggregate treatment. This class could includes most QoS applications. In this QoS arrangement, applications self-select from several shared priority levels. There are no bandwidth guarantees, and applications that select the same class may contend for that class' resources. In this approach, applications need not "register" for a class a-priori. This class, therefore, must be able to account for QoS traffic so that it can be billed by bytes or buckets. Many levels are possible, and may include individual treatment. In this QoS arrangement, applications must register for a limited resource for a given time. These applications may have bandwidth expectations, and the approach is to cater to these expectation through prioritization. To prevent undesired interactions among applications at the same priority of service, it is required that per-application treatment, and possibly policing and/or queuing, will prevent contention among apps. In this resource reservation approach, resources are unavailable to similar applications whether the application is in use or not, so the proposed system must support billing both by timing resource allocation as well as by bytes or buckets over time periods—including by the minute. More specifically, applications that need special bandwidth assurance (like a required information rate) are allocated from bandwidth dedicated to this type of service from one of the top two tiers.

One such tier is a strict priority service or Expedited Forwarding. This traffic dominates all other traffic. It could be called a Platinum Olympic Class, and best current practice reserves this class for VoIP and control traffic. For this class to retain its integrity, applications are not allowed to self-select into the class. They must be admitted in a provisioning role and with limitations on the amount of bandwidth they are allowed to consume. Typically that bandwidth would be set to small fraction of the overall network capacity, and less than the total access line capacity so that other applications are not totally starved out.

Another such tier is higher priority service or Assured Forwarding. In this class, the traffic comes after the Expedited Forwarding tier, but before most other traffic. It could be called a Gold Olympic Class, and most applications that require some form of QoS might share one or more queues in this class. The key points are that the class of service can be shared, and queues dedicated to this level might police each application's capability to use the class. Policers, such as the metering application 20, could allow committed rates, and mark bursts so that each app gets what it needs, and has a fair chance at bursting into uncommitted bandwidth.

Still another classification tier is standard priority service or Best Effort. In this class the traffic is part of the crowd. This class is expected to be shared by the overwhelming number of applications. In terms of fairness, applications get "whatever," but can clearly grab bandwidth when competition is absent. And to be fair, "whatever" is typically understood and applied in predictable ways as is found on the Internet. This service class supports non QoS-enabled applications, and is basically what is done today almost everywhere for DSL.

Another tier is lower priority service or Lower Effort. This class is the background task or bulk mail service. Traffic assigned to this class is dominated by all other classes. While this seems like a completely undesirable and underserved approach to networking, it can provide cost-efficient value to certain applications. Notably peer-to-peer can be provided a "break" on bandwidth and download limits by self-selecting to "step out of the way" of more interactive applications, like e-mail and web surfing. Similarly, backup and subscription services that want to move a lot of data, but don't want to get in the way of more interactive uses of the DSL access can get their job done through this class.

So, how traffic is classified may determine the rate limit 40. Once traffic is classified, the metering application 20 polices and enforces the rate limit 40. When an actual bit rate exceeds the rate limit 40, the metering application 20 decides whether to enforce the rate limit 40. If the metering application 20 decides to enforce the rate limit 40, the metering application may discard packets of data within the traffic. When packets are discarded, the bit rate is reduced. The metering application 20, then, may include computer-readable instructions that logically specify when enforcement is required. The metering application 20, for example, may strictly enforce the rate limit 40. That is, when traffic exceeds the rate limit for the class, the metering application 20 has no discretion on enforcement. The metering application 20 discards packets until the actual bit rate is within the prescribed class limit. Alternatively, the metering application may actively decide to enforce the rate limit and may intentionally discard packets of data until the observed or measured bit rate is less than or equal to the maximum bit rate permitted for the associated rate class. Because packets are discarded, the metering application 20 produces a degraded version of traffic. The degraded version has a lesser bandwidth and, thus, a lower bit rate.

A sophisticated scheme, however, includes discretion. The metering application 20 may utilize multiple sources of information to decide when enforcement of the rate limit 40 is needed. Even though a particular end-user is requesting content that exceeds the rate limit 40, the metering application may have discretion to enforce. The metering application 20, for example, may weigh current network bandwidth requirements. The communications network 26, for example, might have excess bandwidth availability, so the metering application 20 may permit the end-user to exceed the rate limit 40. If the customer's request would degrade network performance below some threshold, then the metering application may also have discretion to degrade the customer's service to maintain adequate network performance levels.

Another discretionary scheme may include business models. Various business issues may also influence when, and how, the metering application 20 enforces the rate limit 40. The end-user's monthly payment, and/or payment history, for example, may determine how rate requests are handled. Perhaps the end-user is a "good" customer, so the metering application 20 "overlooks" excessive bit rates. What determines a "good" customer, of course, may have many meanings. The end-user may have a consistent and on-time payment history, so the metering application 20 has discretion to enforce the rate limit 40. If the end-user has a history of one or more delinquent payments, however, the metering application 20 may more strictly enforce rate limits. Delinquent payments may, then, influence the frequency of enforcement of the rate limit 40. Service level agreements may be enforced more strictly, or more leniently, based upon payment history.

Other business models may include customer abuse of the communications network 26. The end-user may have a history of "bad behavior," and this behavior may influence how and/or when packets of data are discarded. If, for example, the end-user is a sender of spam email or other spam content, the service provider may decide to strictly enforce rate limits. Other undesirable or "bad" behavior may include suspected infringement of intellectual property rights, such as downloading of copyrighted content. Even objectionable content requests, such as pornographic content requests, may be degraded to a lower rate limit. In fact, some classes of content, or even the content itself, may default to lower rate limits to discourage requests and downloads. Rate limits could be imposed based upon the requested content. Content having little or no risk may have a higher rate limit than riskier content.

Another discretionary scheme may include a history of excessive bit rate requests. The metering application 20 may track the frequency of customer requests that exceed their rate limit. The metering application 20 may have discretion to ignore, or only slightly degrade, infrequent requests that exceed the rate limit 40. In other words, if the end-user rarely exceeds the rate limit 40 for their class, the metering application 20 has discretion. If, however, the end-user frequently requests or sends traffic that exceeds the rate limit 40, this persistent activity may influence metering and/or discarding of packets.

The various discretionary schemes may be contained within a profile. However the metering application 20 decides to degrade service, the metering application may consult a profile. Each end-user would have a profile, and the profile is stored in a database. When the metering application 20 detects an excessive bit rate, the metering application 20 queries the customer's profile stored in the database. The customer's profile contains payment history and/or usage history. The metering application would retrieve information from the profile to determine whether degradation is desired.

Figure 4:
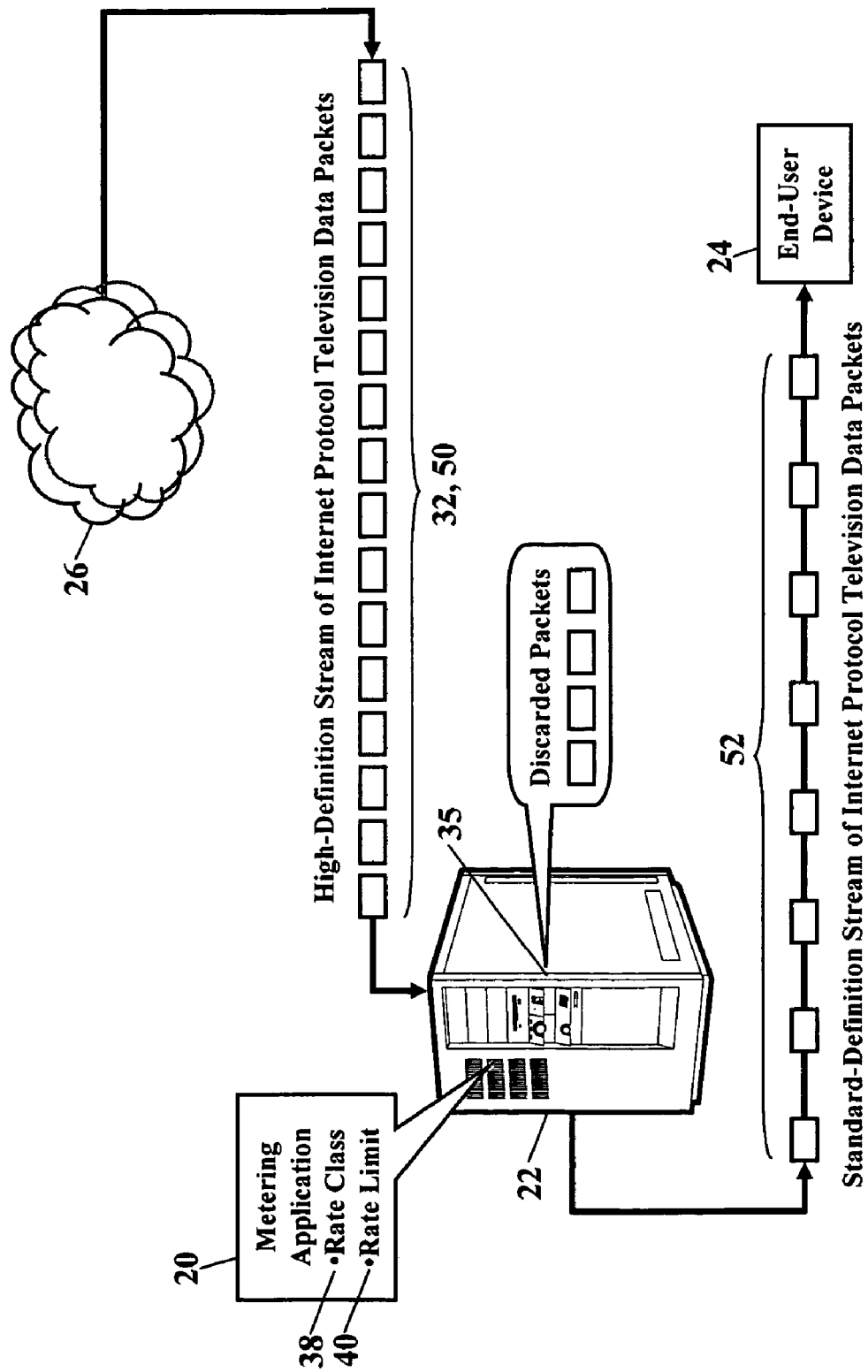
FIG. 4 is a schematic illustrating another scheme for enforcing rate limits, according to more exemplary embodiments.

FIG. 4 is a schematic illustrating another scheme for enforcing rate limits, according to more exemplary embodiments. When actual bit rates exceed the rate limit 40, the metering application 20 may degrade traffic to reduce the bit rate. FIG. 4 illustrates the requested content 32 flowing to the computer server 22. The metering application 20 identifies the requested content 32 as a high-definition stream 50 of Internet Protocol television data packets. The metering application 20 then classifies the high-definition stream 50 according to the rate class 38 and the associated rate limit 40. If, however, the actual bit rate of the high-definition stream 50 exceeds the rate limit 40, the metering application 20 must decide whether to enforce the rate limit 40. If the metering application 20 decides to enforce the rate limit, the metering application 20 may decide to degrade the high-definition stream 50 of Internet Protocol television data packets. FIG. 4, then, illustrates that the metering application may degrade the high-definition stream 50 to a standard definition stream 52 of Internet Protocol television data packets. That is, the metering application 20 discards packets of data, such that the high-definition content is lost. What emerges from the computer server 22 is the degraded, standard definition stream 52 of Internet Protocol television data packets. The metering application 20 thus causes degradation from high definition television service to standard definition television service. The bit rate of the degraded, standard definition stream 52 is less than or equal to the rate limit 40.

Figure 5:
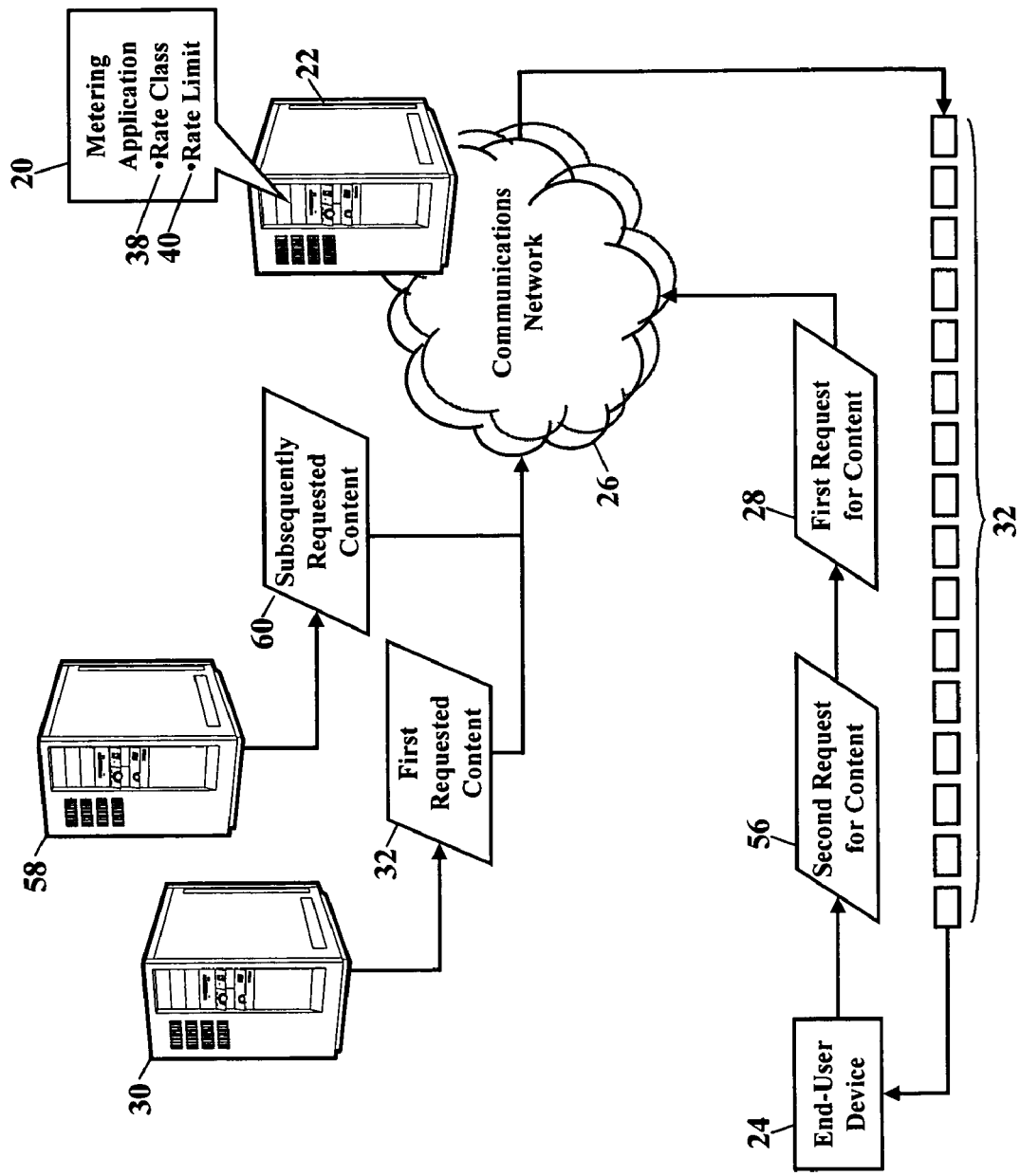
FIGS. 5-7 are schematics illustrating schemes for enforcing rate limits when two or more streams are requested, according to yet more exemplary embodiments.
Figure 6:
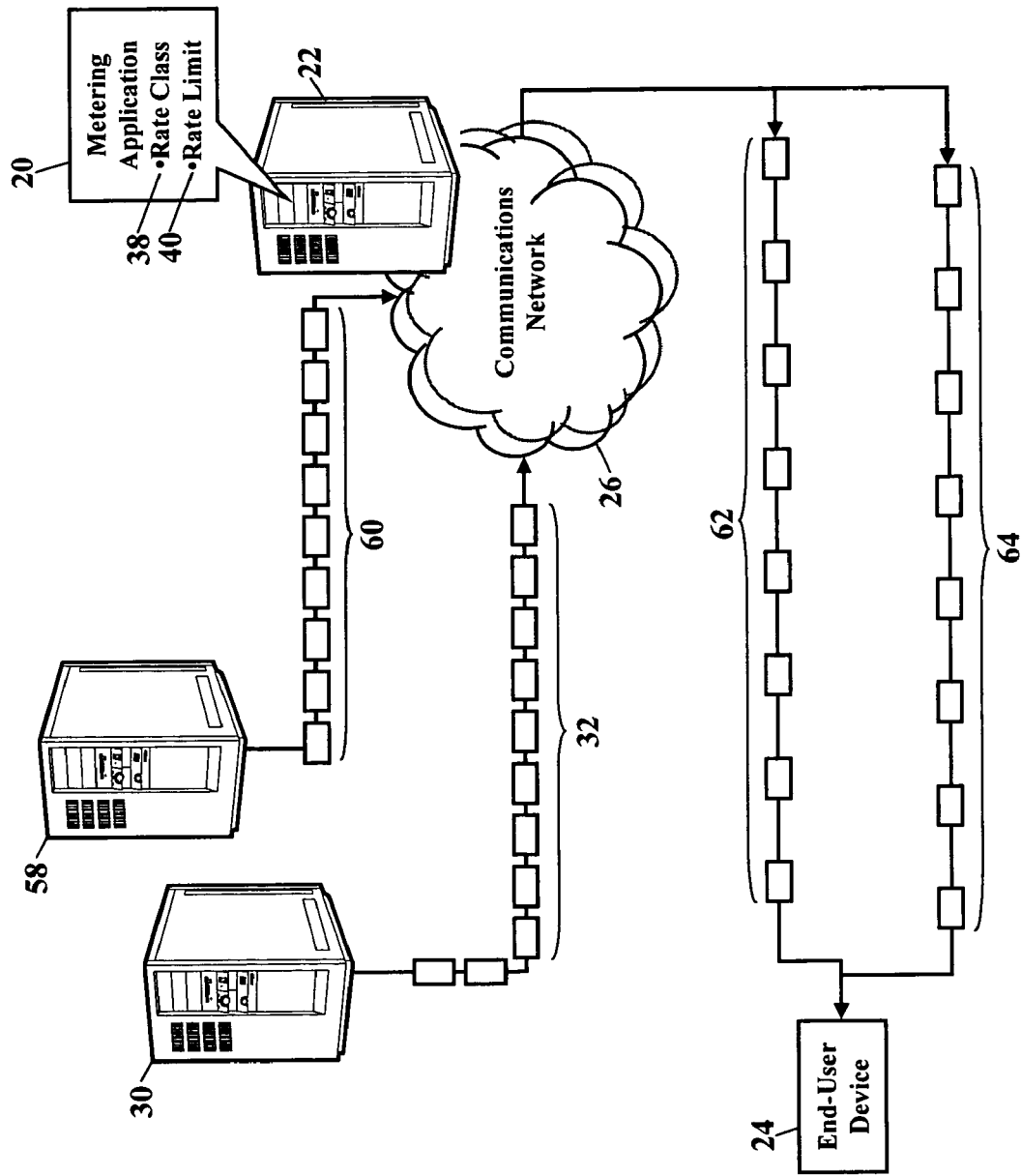
Figure 7:
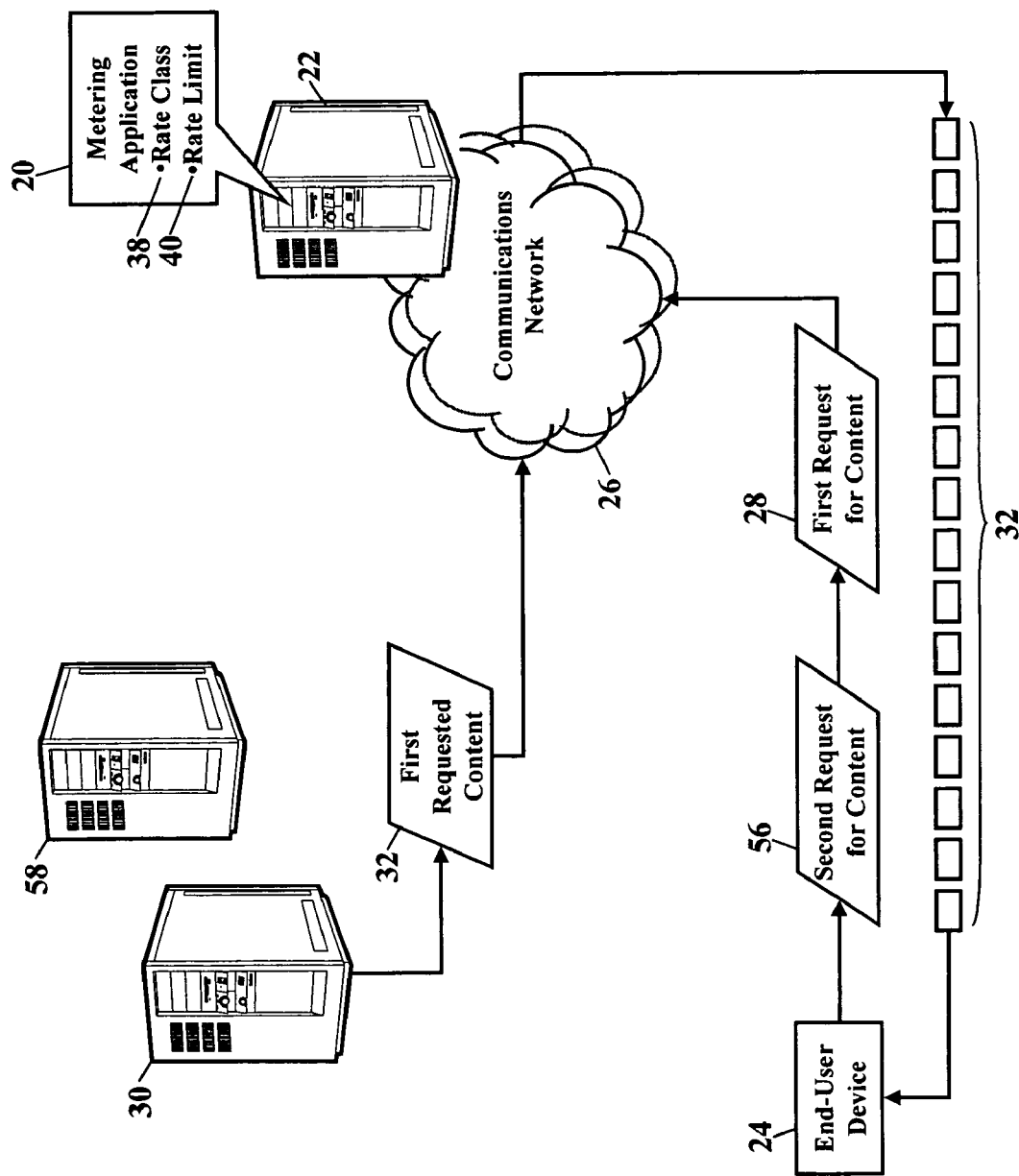

FIGS. 5-7 are schematics illustrating another scheme for enforcing rate limits, according to yet more exemplary embodiments. Here the end-user, using the end-user device 24, makes two requests for content streams. One or both content streams exceed the allowable rate limit for the class, so the metering application 20 must decide whether this excessive rate request is permissible. When the metering application 20 enforces the rate limit 40, the metering application 20 must apply a scheme for concurrent streams.

FIG. 5, then, illustrates one scheme for concurrent streams. As FIG. 5 shows, the end-user issues the first request 28 for content and, and some other time, the end-user issues a subsequent, second request 56 for content. The first request 28 communicates to the content server 30, and the content server 30 retrieves and forwards the requested first content 32. Similarly, the subsequent request 56 communicates to another content server 58 (or the content server 30), and that another content server 58 retrieves and forwards the subsequently requested content 60. Both streams 32, 60 communicate along the communications network 26 and encounter the metering application 20 operating in the computer server 22. The metering application 20 identifies and classifies each stream 32 and 60. Because both streams 32 and 60 are destined for the same end-user device 24, most likely a single rate limit 40 applies to the combined bandwidth. That is, even though the end-user has requested two distinct streams of data, the bandwidth consumed by both streams still must be less than or equal to the rate limit 40. When the rate limit 40 is exceeded, the metering application 20 must decide whether degradation is needed and, if so, how one or both streams are degraded.

When degradation is needed, the metering application may employ various schemes. As FIG. 5 illustrates, one simple scheme is to cancel, or drop, one of the requested streams. The metering application 20 decides which stream 32 or 60 is dropped. FIG. 5 applies the "first in, first out" principle such that the requested first content 32 is permitted to pass to the end-user device 24. The metering application 20, however, decides to drop or cancel the subsequently requested content 60. If the bit rate of the remaining first content stream 32 is less than the rate limit 40, then no further processing may be required. If, however, the bit rate of the remaining first content stream 32 is still greater than the rate limit 40, then the metering application 20 would apply the other schemes discussed herein to further reduce the bit rate. Even though FIG. 5 illustrates the "first in, first out" principle, the metering application 20 could alternatively employ a "last in, first out" principle.

FIG. 6 is a schematic illustrating an alternative scheme for concurrent streams, according to the exemplary embodiments. FIG. 6 is similar to FIG. 5 and again shows both streams 32 and 60 communicating along the communications network 26 and encountering the metering application 20 operating in the computer server 22. Because both streams 32 and 60 are destined for the same end-user device 24, the bandwidth consumed by both streams must be less than or equal to the rate limit 40. When the rate limit 40 is exceeded, here the metering application 20 degrades both streams 32 and 60. That is, the metering application 20 discards packets of data from both the first stream 32 and the subsequent second stream 60 to reduce the combined bit rate. Here, then, the metering application 20 strives to provide both streams to the same end-user, but both streams 32 and 60 must be degraded. The metering application 20, for example, could degrade high-definition television service to standard definition service. Should both the first stream 32 and the second stream 60 be composed of high-definition Internet Protocol television data packets, the metering application 20 would discard packets from both streams such that the combined bit rate is less than or equal to the maximum bit rate. The metering application 20 would discard packets of data such that both streams 32 and 60 are reduced to standard-definition Internet Protocol television service. The degraded, standard-definition Internet Protocol television service streams 62 and 64 are delivered to end user device 24.

FIG. 7 is a schematic illustrating another scheme for concurrent streams, according to the exemplary embodiments. The end-user, as before, issues the first request 28 for content and the subsequent request 56 for content. The metering application 20 receives notification of each request 28 and 56. The metering application 20 is informed of each request 28 and 56 by various means. Each request 28 and 56, for example, may first route to the metering application 20. Each content server 30 and 58, alternatively or additionally, may communicate a notification of each requested stream to the metering application 20. A network control layer may also inform the metering application 20 of each request 28 and 56. Regardless of how the metering application 20 is informed, the metering application 20 may determine that the combined bandwidth consumed by both streams will exceed the rate limit 40. Here, then, the metering application 20 proactively cancels the subsequent request 56 for content. The metering application 20 may communicate a cancel command to the second content server 58. The metering application 20 may additionally or alternatively quarantine the subsequent request 56 for content, thus preventing the second content server 58 from receiving the subsequent request 56. If the bit rate of the first requested content stream 32 is less than the rate limit 40, then no further processing may be required. If, however, the bit rate of the remaining first content stream 32 is still greater than the rate limit 40, then the metering application 20 would apply the schemes discussed herein to further reduce the bit rate.

Figure 8:
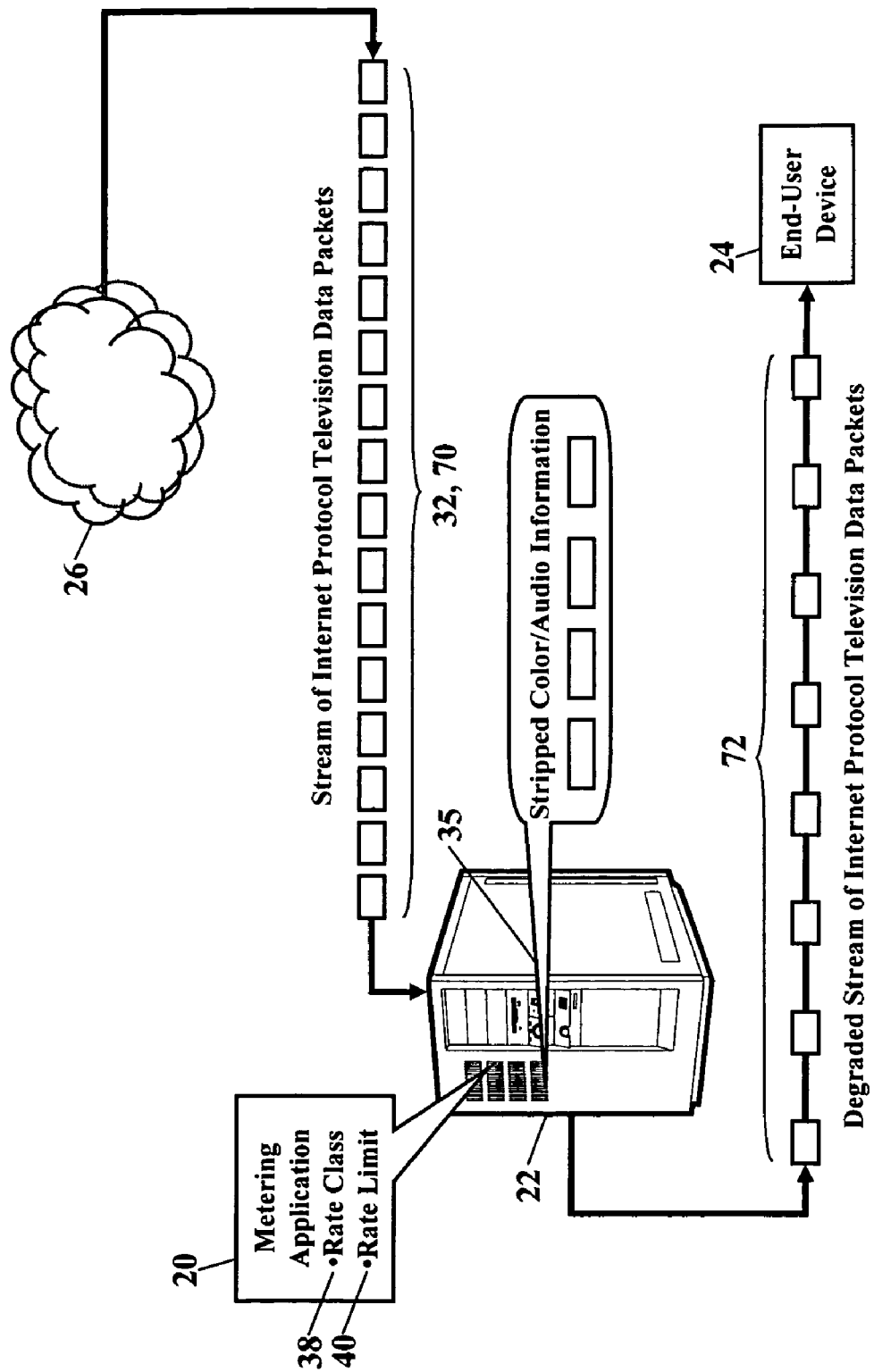
FIG. 8 is a schematic illustrating stripping and discarding information to enforce rate limits, according to more exemplary embodiments.

FIG. 8 is a schematic illustrating another scheme for enforcing rate limits, according to more exemplary embodiments. Here the metering application 20 strips and discards certain information to reduce bandwidth. The requested content 32 flows to the computer server 22. The metering application 20 identifies the requested content 32 as a stream 70 of Internet Protocol television data packets. The metering application 20 then classifies the stream 70 according to the rate class 38 and the associated rate limit 40. When the actual bit rate of the stream 70 exceeds the rate limit 40, the metering application 20 must decide whether to enforce the rate limit 40. If the metering application 20 enforces the rate limit 40, the metering application 20 may remove or strip information from the stream 70 of Internet Protocol television data packets. FIG. 8, for example, illustrates that the metering application 20 strip and discard color information from the stream 70 of Internet Protocol television data packets to reduce the bit rate. The resultant, egressing stream 72 exiting the computer server 22 would be reduced in bandwidth to essentially a black and white television experience. If the bit rate of the stream 70 still exceeds the rate limit 40, the metering application 20 may additionally or alternatively strip and discard audio information from the stream 70 of Internet Protocol television data packets to reduce the bit rate.

Figure 9:
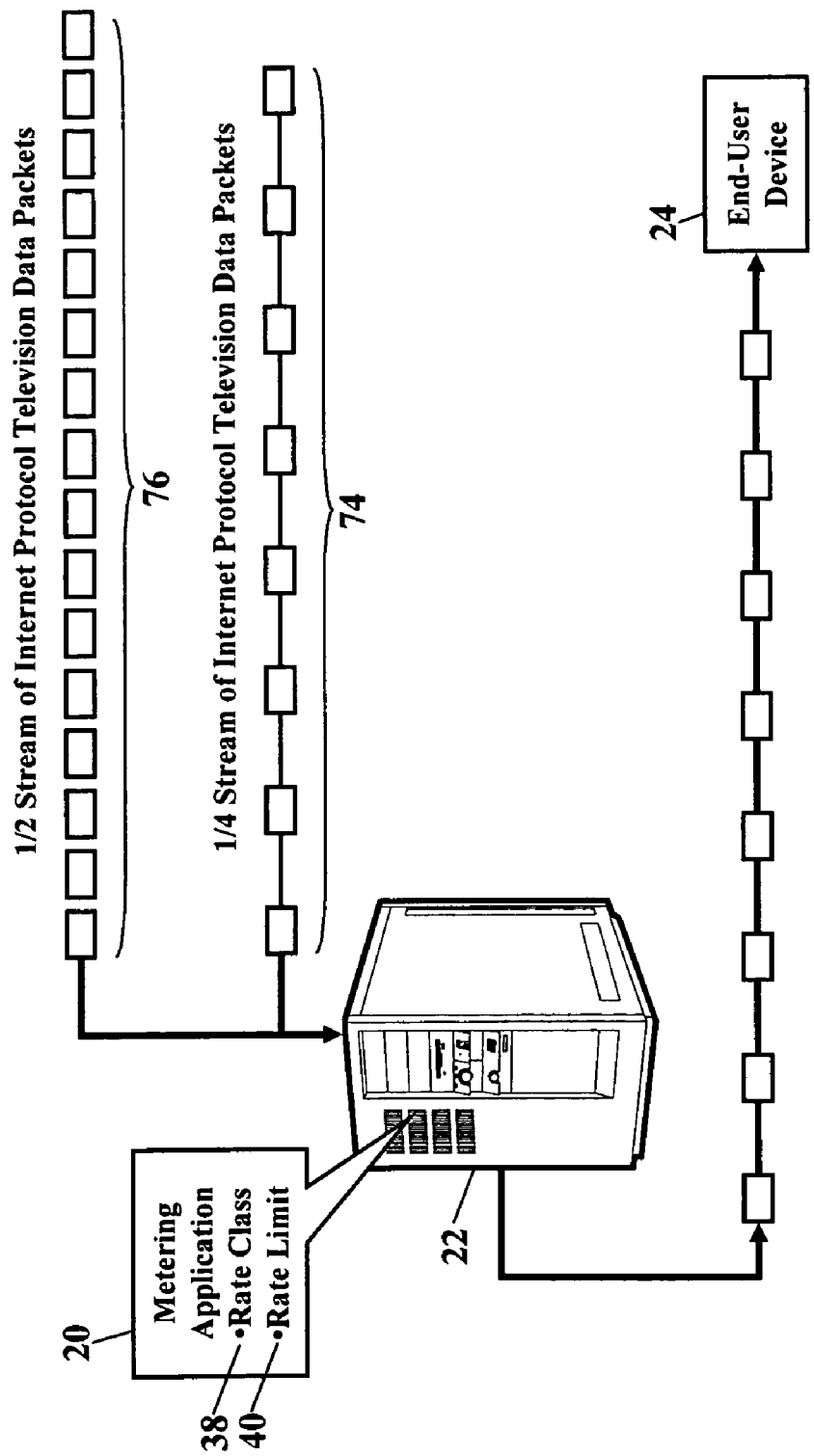
FIG. 9 is a schematic illustrating multi-layer encoding for enforcing rate limits, according to still more exemplary embodiments.

FIG. 9 is a schematic illustrating more schemes for enforcing rate limits, according to still more exemplary embodiments. Here the metering application 20 uses multi-layer encoding to reduce bandwidth. The metering application 20 receives multiple layers of coded streams corresponding to different sized pictures. The metering application 20, for example, may receive a coded one-quarter (¼) stream 74 and a coded one-half (½) stream 76. The coded one-quarter (¼) stream 74 requires one fourth (¼) of the bandwidth of a full-sized stream, while the coded one-half (½) stream 76 requires one half (½) of the bandwidth of a full-sized stream. The coded one-quarter (¼) stream 74 contains one fourth the pixels, thus producing only a quarter screen experience at the end-user's display device. Similarly, the coded one-half (½) stream 76 contains fifty percent (50%) of the pixels, thus producing a half-screen experience at the end-user's display device. The metering application may sum, or replicate, various streams to achieve whatever picture scale or size is desired. When the metering application 20 must degrade a stream to enforce the rate limit 40, the metering application 20 can selectively differentiate between the coded streams 74 and 76 to reduce bandwidth. The end-user receives their requested content, but the viewing experience (e.g., screen size) is degraded, and thus bandwidth is reduced, according to the rate limit 40.

Figure 10:
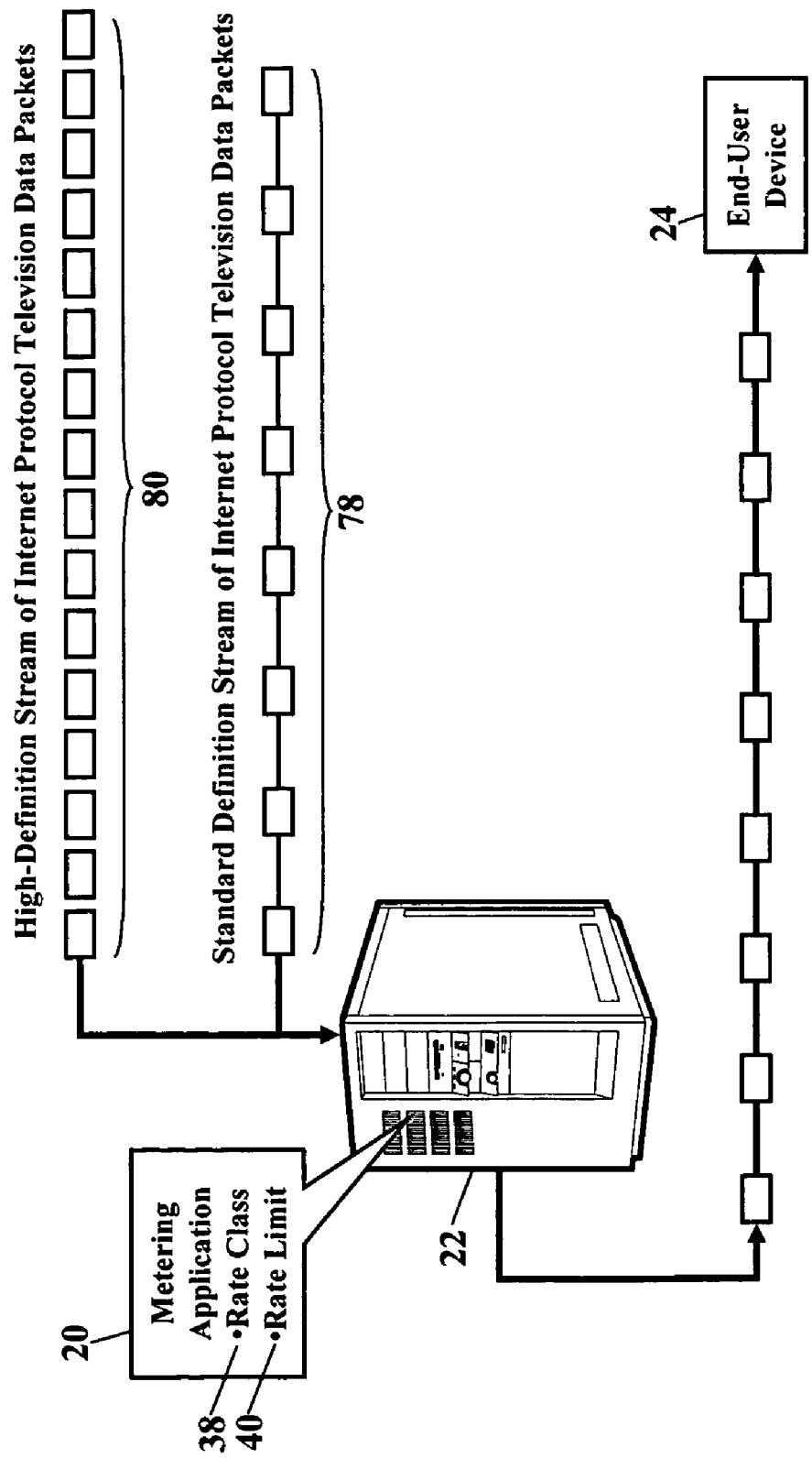
FIG. 10 is a schematic illustrating degradation of television service to enforce rate limits, according to even more exemplary embodiments.

FIG. 10 is a schematic illustrating yet more schemes for enforcing rate limits, according to even more exemplary embodiments. Here the metering application 20 receives two separate channels streams. A standard definition stream 78 is encoded at a standard definition rate, while a high-definition stream 80 is encoded at a high definition rate. If the rate class 38 permits the higher rate of the high definition stream 80, then no degradation is needed. If, however, the rate class 38 does not permit transmission of the high definition stream 80, the metering application 20 switches feeds to the standard definition stream 78. So, even though the end-user may have requested an HDTV experience, the end-user only subscribes to a standard definition class.

Figure 11:
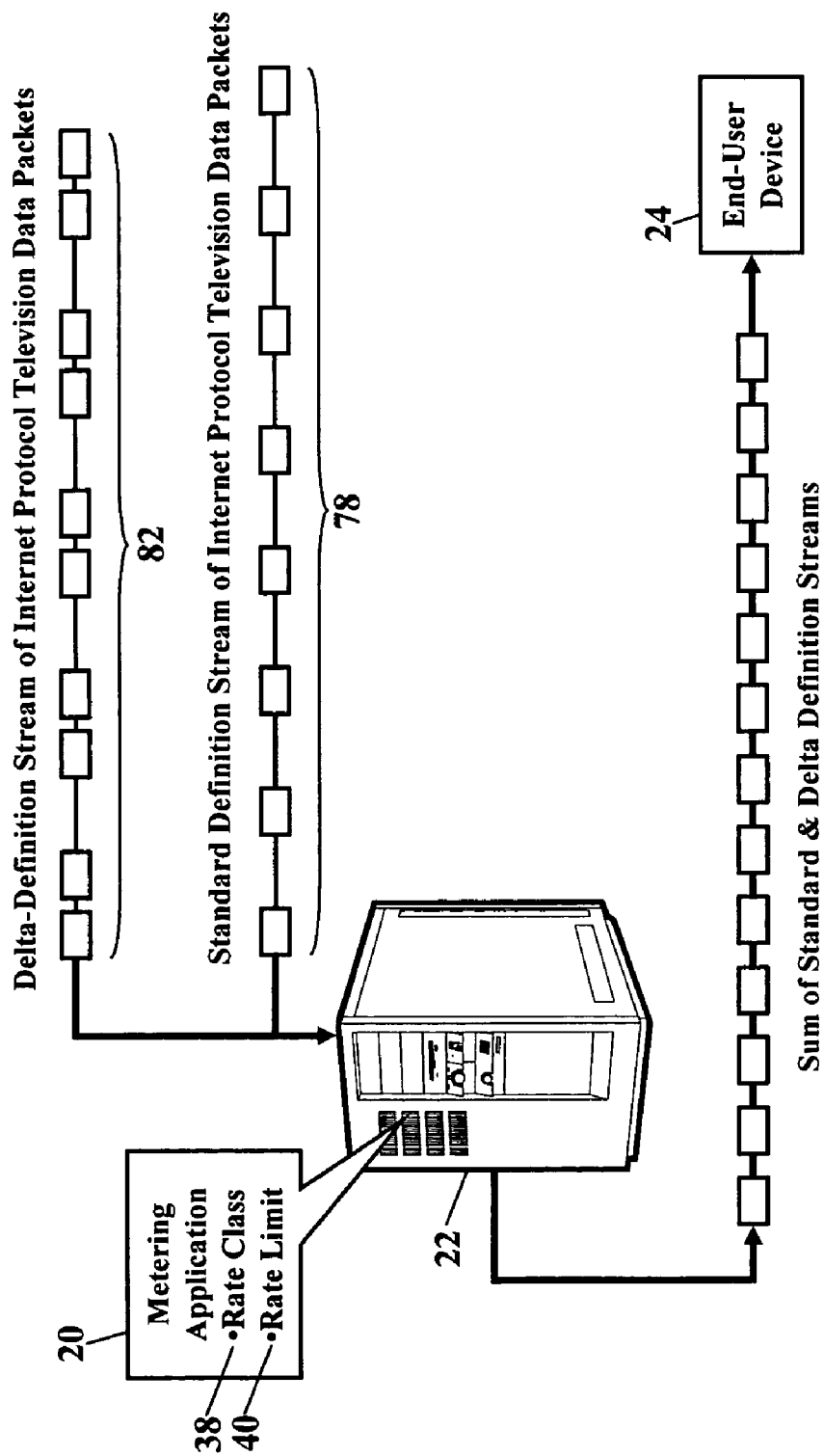
FIG. 11 is a schematic illustrating a delta definition stream to enforce rate limits, according to more exemplary embodiments.

FIG. 11 is a schematic illustrating more schemes for enforcing rate limits, according to more exemplary embodiments. Here the metering application 20 again receives two separate channels streams. The standard definition stream 78 is encoded at the standard definition rate. A delta definition stream 82 is also received, and the delta definition stream 82 contains additional information for the HDTV experience. If the rate class 38 permits the HDTV experience, then the metering application 20 passes, or sums, the standard definition stream 78 and the delta definition stream 82. If, however, the rate class 38 does not permit an HDTV experience, the metering application 20 only communicates the standard definition stream 78. Again, even though the end-user may have requested an HDTV experience, if the end-user only subscribes to a standard definition class, the metering application 20 degrades to the standard TV experience.

The end-user device 24 may also take actions. When the metering application 20 discards packets, the end-user device 24 may intelligently determine that poor video conditions exist. Recall that when the metering application 20 discards packets, the degraded stream (shown as reference numeral 42 in FIG. 3) exits the computer server 22. Because packets have been discarded, the degraded stream has a lesser bandwidth. The degraded stream travels along the communications network 26 to the end-user device 24. When the end-user device 24 receives the degraded stream, the end-user device may itself analyze the degraded stream. The end-user device 24 may determine that too much information has been discarded. That is, the degraded stream produces an unacceptable video experience. The end-user device 24 may then determine that the requested, but degraded, channel is unavailable.

Data streams may also be enhanced. Heretofore the metering application 20 has been described as discarding/clipping packets to reduce bandwidth. The metering application 20, however, may also enhance streams of data. The metering application 20, for example, may enhance data to improve color, sound, resolution, or any other characteristic or performance criteria. The end-user device 24, likewise, may also enhance streams. Recall again that the metering application 20 discards or clips packets to reduce bandwidth. When the end-user device 24 receives the degraded stream, the end-user device analyzes the degraded stream. If the amount of clipping is small/limited, the end-user device may take actions to enhance picture quality. The end-user device may interpolate between data, and/or the end-user device 24 may correct for noticeable and/or known errors or conditions.

The metering application 20 operates regardless of the packet protocol. That is, any packet protocol is suitable for these concepts. As those of ordinary skill in the art understand, sometimes information is packetized (or "framed") for use in packet networks. The information is grouped into packets according to a packet protocol. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. Because many networks are "mixed"—that is, the network receives and handles packets of differing protocols, a "translator" determines the particular packet protocol and the appropriate destination for each packet. Because the basics of packetizing and packet protocols are well-known, packetizing schemes are not further described here.

Figure 12:
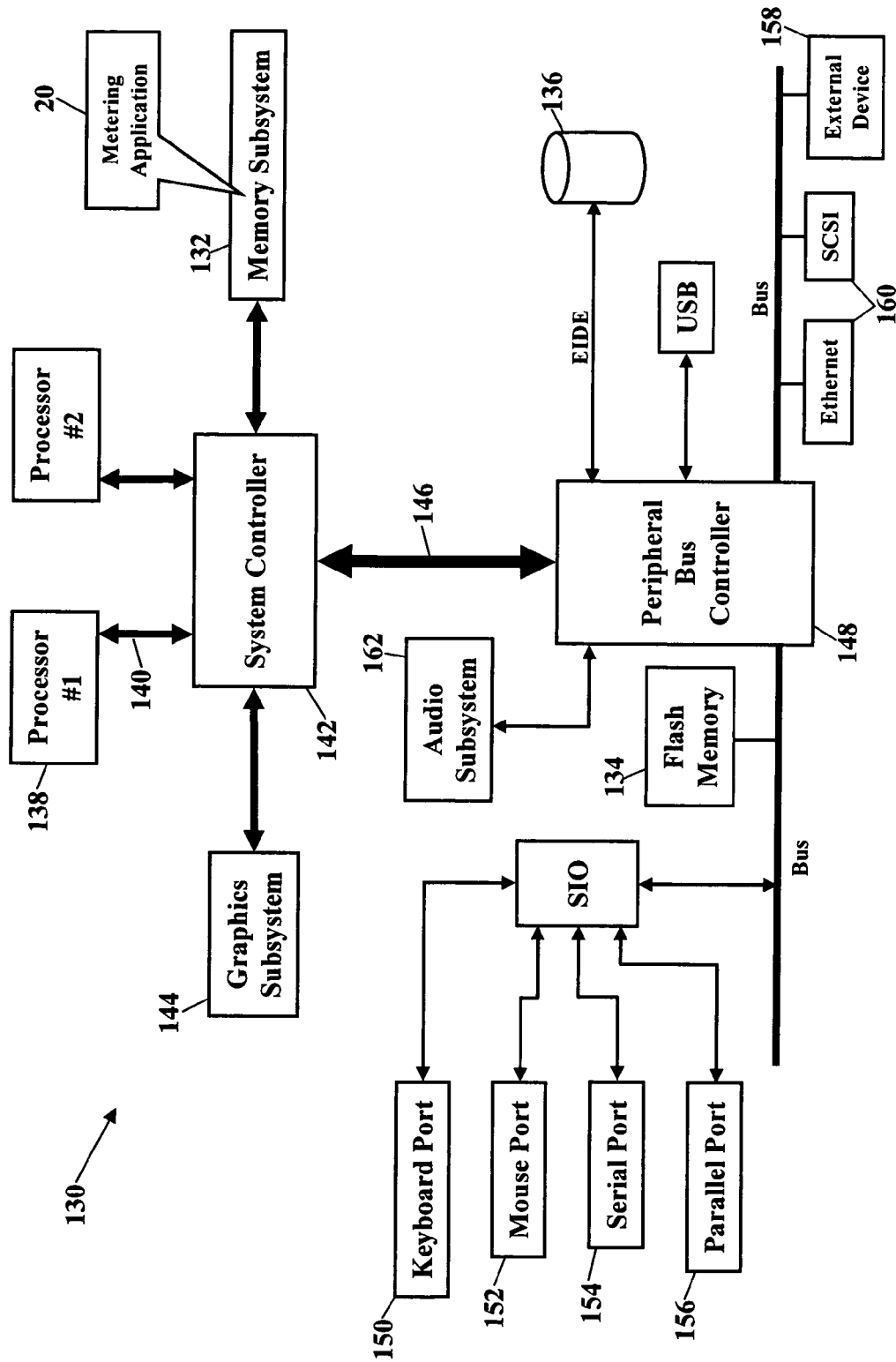
FIG. 12 depicts another possible operating environment for the exemplary embodiments.

FIG. 12 depicts another possible operating environment for the exemplary embodiments. FIG. 12 is a block diagram showing the metering application 20 residing in a computer system 130 (such as the computer server 22 shown in FIGS. 1-11). FIG. 12, however, may also represent a block diagram of the end-user device (shown as reference numeral 24 in FIGS. 1-11). FIG. 12, in fact, may represent a block diagram of the metering application 20 operating in any processor-controlled device, such as a personal digital assistant (PDA), a Global Positioning System (GPS) device, an interactive television, an Internet Protocol (IP) phone, a pager, a cellular/satellite phone, or any communications device utilizing a digital signal processor (DSP). FIG. 12 may also represent a block diagram of watches, radios, vehicle electronics, clocks, printers, gateways, and other apparatuses and systems utilizing the metering application 20.

As FIG. 12 shows, the metering application 20 operates within a system memory device. The metering application 20, for example, is shown residing in a memory subsystem 132. The metering application 20, however, could also reside in flash memory 134 or peripheral storage device 136. The computer system 130 also has one or more central processors 138 executing an operating system. The operating system, as is well known, has a set of instructions that control the internal functions of the computer system 130. A system bus 140 communicates signals, such as data signals, control signals, and address signals, between the central processor 138 and a system controller 142 (typically called a "Northbridge"). The system controller 142 provides a bridging function between the one or more central processors 138, a graphics subsystem 144, the memory subsystem 132, and a PCI (Peripheral Controller Interface) bus 146. The PCI bus 146 is controlled by a Peripheral Bus Controller 148. The Peripheral Bus Controller 148 (typically called a "Southbridge") is an integrated circuit that serves as an input/output hub for various peripheral ports. These peripheral ports could include, for example, a keyboard port 150, a mouse port 152, a serial port 154 and/or a parallel port 156 for a video display unit, one or more external device ports 158, and networking ports 160 (such as SCSI or Ethernet). The Peripheral Bus Controller 148 could also include an audio subsystem 162. Those of ordinary skill in the art understand that the program, processes, methods, and systems described herein are not limited to any particular computer system or computer hardware.

One example of the central processor 138 may be a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufacturers also offer microprocessors. Such other manufacturers include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). Those skilled in the art further understand that the program, processes, methods, and systems described herein are not limited to any particular manufacturer's central processor.

According to an exemplary embodiment, the WINDOWS® (WINDOWS® is a registered trademark of Microsoft Corporation, One Microsoft Way, Redmond Wash. 98052-6399, 425.882.8080) operating system may be used. Other operating systems, however, are also suitable. Such other operating systems would include the UNIX® operating system (UNIX® is a registered trademark of the Open Source Group), the UNIX-based Linux operating system, WINDOWS NT®, and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described herein are not limited to any particular operating system.

The system memory device (shown as memory subsystem 132, flash memory 134, or peripheral storage device 136) may also contain an application program. The application program cooperates with the operating system and with a video display unit (via the serial port 154 and/or the parallel port 156) to provide a Graphical User Interface (GUI). The Graphical User Interface typically includes a combination of signals communicated along the keyboard port 150 and the mouse port 152. The Graphical User Interface provides a convenient visual and/or audible interface with a user of the computer system 130.

Figure 13:
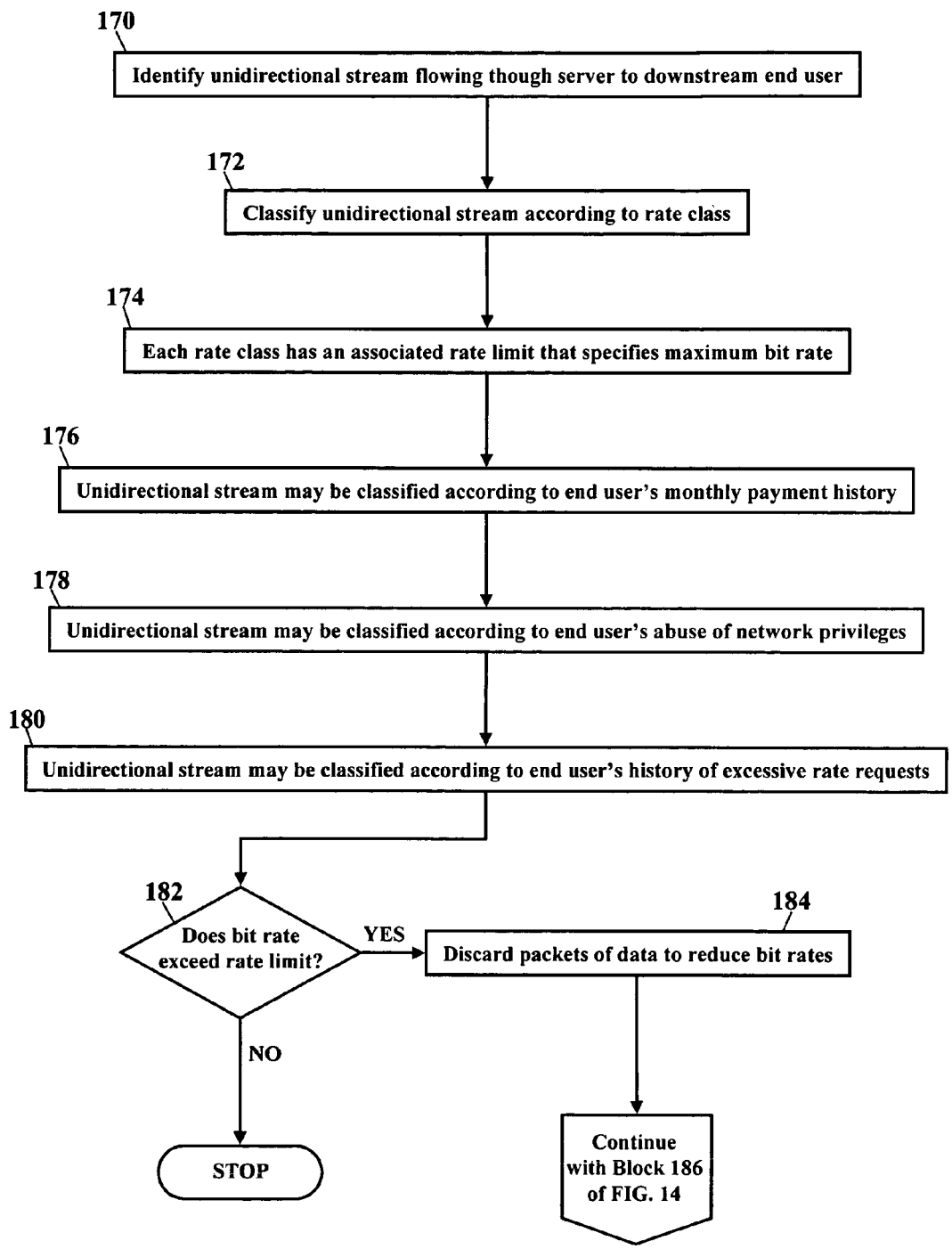
FIGS. 13 & 14 are flowcharts illustrating a method for enforcing rate limits, according to still more exemplary embodiments.

FIG. 13 is a flowchart illustrating a method of enforcing a rate limit for data traffic. A unidirectional stream is identified flowing though a server to a downstream end user (Block 170). The unidirectional stream is classified according to a rate class (Block 172). Each rate class has an associated rate limit, and each rate limit specifies a maximum bit rate at which the unidirectional stream may flow (Block 174). The unidirectional stream may be classified according to at least one of i) the end user's monthly payment history (Block 176), ii) the end user's abuse of network privileges (Block 178), and/or iii) the end user's history of excessive bit rate requests (Block 180). Enforcement of the rate limit may be influenced by a history of one or more delinquent payments, a history of bad behavior (such as spamming activity), and/or a history of repeated requests for data that exceed the maximum bit rate. If the actual bit rate is less than or equal to the rate limit (Block 182), then the metering application need not, but still may, take action to reduce bandwidth. If, however, the actual bit rate exceeds the rate limit (Block 182), then packets of data are discarded to reduce bit rates (Block 184).

Figure 14:
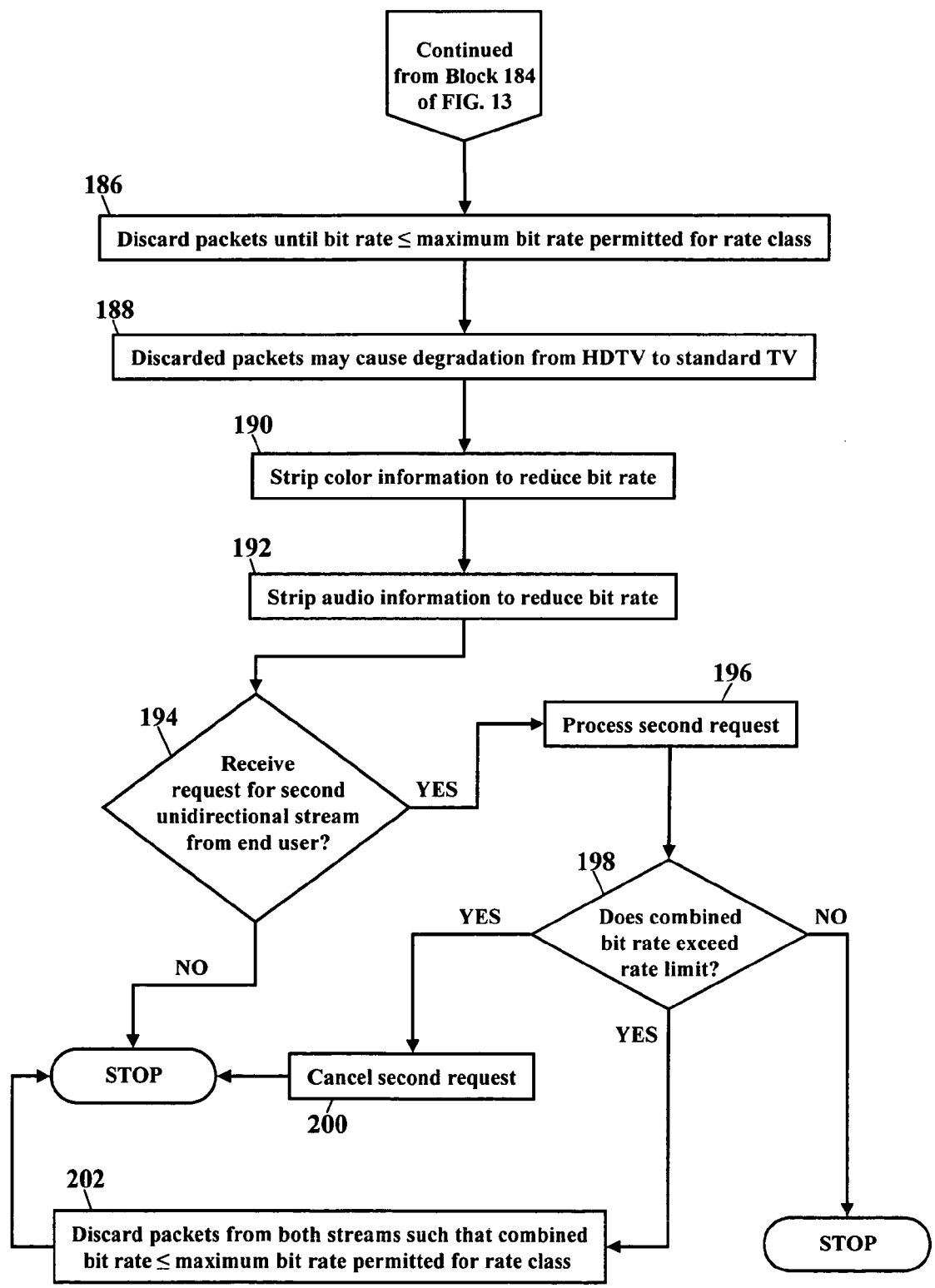

The flowchart continues with FIG. 14. Packets are discarded until the bit rate is less than or equal to the maximum bit rate permitted for the associated rate class (Block 186). The discarded packets may cause degradation from high definition television service to standard definition television service (Block 188). Color information may be stripped to reduce the bit rate (Block 190). Audio information may also be stripped from the unidirectional stream to reduce bit rate (Block 192). If a request for a second unidirectional stream is received from the same end user (Block 194), then that request is processed (Block 196). If, however, the combined bit rate of the first and second streams exceeds the maximum bit rate permitted for the associated rate class (Block 198), then the subsequent request may be canceled (Block 200). An alternative scheme discards packets of data from both the first and second streams to reduce the combined bit rate such that the combined bit rate is less than or equal to the maximum bit rate (Block 202).

The metering application may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer-readable media, and other types not mention here but considered within the scope of the exemplary embodiments, allow the metering application to be easily disseminated. A computer program product comprises the metering application stored on the computer-readable medium. The metering application comprises computer-readable instructions for enforcing a rate limit for data traffic. The computer-readable instructions identify a unidirectional stream flowing though a server to a downstream end user. The unidirectional stream is classified according to a rate class, with each rate class having an associated rate limit. Each rate limit specifies a maximum bit rate at which the unidirectional stream may flow. Packets of data within the unidirectional stream are discarded to reduce a bit rate such that the bit rate is less than or equal to the maximum bit rate permitted for the associated rate class.

The metering application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of enforcing a rate limit for data traffic, the method comprising:
   identifying a unidirectional stream of data packets flowing to a downstream end user;
   at a metering application network management tool, classifying the unidirectional stream data packets according to a rate class, with each rate class having an associated rate limit, each rate limit specifying a maximum bit rate for the unidirectional; and
   discarding packets of data within the unidirectional stream of data packets to reduce a bit rate such that the bit rate is less than or equal to the maximum bit rate permitted for the associated rate class and the bit rate is greater than zero;
   wherein the unidirectional stream of data packets is provided as a combination of a first unidirectional stream in response to a first request from the end user and a second unidirectional stream of data packets in response to a second request from the same end user;
   wherein discarding packets includes discarding packets of data from both the first and second streams to reduce a combined bit rate such that the combined bit rate is less than or equal to the maximum bit rate;
   wherein classifying the unidirectional stream of data packets comprises classifying according to the end user's monthly payment history, wherein a history of one or more delinquent payments influences a frequency of enforcement of the rate limit.

2. A method according to claim 1, wherein the unidirectional stream of data packets comprises Internet Protocol television packets.

3. A method according to claim 2, further comprising of discarding packets of data to cause a degradation from high definition television service to standard definition television service.

4. A method according to claim 2, wherein discarding the packets of data comprises at least one of i) stripping color information from the unidirectional stream of Internet Protocol television data packets to reduce the bit rate and ii) stripping audio information from the unidirectional stream of Internet Protocol television data packets to reduce bit rate.

5. A method according to claim 1, wherein classifying the unidirectional stream of data packets comprises classifying according to:
   the end user's abuse of network privileges, wherein a history of bad behavior, such as spamming activity, influences the frequency of enforcement of the rate limit; and
   the end user's history of excessive bit rate requests, wherein a history of repeated requests for data that exceed the maximum bit rate influences the frequency of enforcement of the rate limit.

6. A system for enforcing a rate limit for data traffic, the system comprising:
   a metering application stored in a memory device, and a processor communicating with the memory device;
   the metering application identifying a unidirectional stream of data packets flowing though the system to a downstream end user;
   the metering application classifying the unidirectional stream of data packets according to a rate class, with each rate class having an associated rate limit, each rate limit specifying a maximum bit rate for the unidirectional stream; and the metering application discarding packets of data within the unidirectional stream of data packets to reduce a bit rate such that the bit rate is less than or equal to the maximum bit rate permitted for the associated rate class and the hit rate is greater than zero;
   wherein the unidirectional stream of data packets is provided as a combination of a first unidirectional stream in response to a first request from the end user and a second unidirectional stream of data packets in response to a second request from the same end user;
   wherein the metering application performs discarding packets of data from both the first and second streams to reduce a combined bit rate such that the combined bit rate is less than or equal to the maximum bit rate;
   wherein classifying the unidirectional stream of data packets comprises classifying according to the end user's monthly payment history, wherein a history of one or more delinquent payments influences a frequency of enforcement of the rate limit.

7. A system according to claim 6, wherein the unidirectional stream of data packets comprises Internet Protocol television packets, and wherein the metering application discards packets to cause a degradation from high definition television service to standard definition television service.

8. A system according to claim 7, wherein the metering application further performs at least one of i) stripping color information from the unidirectional stream of Internet Protocol television data packets to reduce the bit rate and ii) stripping audio information from the unidirectional stream of Internet Protocol television data packets to reduce bit rate.

9. A system according to claim 6, wherein the metering application classifies according to:
- the end user's abuse of network privileges, wherein a history of bad behavior, such as spamming activity, influences the frequency of enforcement of the rate limit; and
- the end user's history of excessive bit rate requests, wherein a history of repeated requests for data that exceed the maximum bit rate influences the frequency of enforcement of the rate limit.

10. A computer program product, comprising:
- a non-transitory computer-readable medium; and
- a metering application stored on the computer-readable medium, the metering application comprising computer-readable instructions for enforcing a rate limit for data traffic, the computer-readable instructions
- identifying a unidirectional stream of Internet Protocol television data packets flowing though a server to a downstream end user;
- classifying the unidirectional stream of Internet Protocol television data packets according to a rate class, with each rate class having an associated rate limit, each rate limit specifying a maximum bit rate for the unidirectional stream; and
- discarding packets of data within the unidirectional stream of Internet Protocol television data packets to reduce a bit rate such that the bit rate is less than or equal to the maximum bit rate permitted for the associated rate class and the bit rate is greater than zero;
- wherein the unidirectional stream of data packets is provided as a combination of a first unidirectional stream in response to a first request from the end user and a second unidirectional stream of data packets in response to a second request from the same end user;
- wherein discarding packets includes discarding packets of data from both the first and second streams to reduce a combined bit rate such that the combined bit rate is less than or equal to the maximum bit rate;
- wherein classifying the unidirectional stream of data packets comprises classifying according to the end user's monthly payment history, wherein a history of one or more delinquent payments influences a frequency of enforcement of the rate limit.

11. A computer program product according to claim 10, wherein the metering application discards the packets of data to cause a degradation from high definition television service to standard definition television service.

12. A computer program product according to claim 10, wherein the metering application further includes instructions for processing a request for a second unidirectional stream of Internet Protocol television data from the same end user, and wherein the metering application further includes instructions that cancel the request when the combined bit rate of the first and second streams exceeds the maximum bit rate permitted for the associated rate class.

13. A computer program product according to claim 10, wherein the metering application further includes instructions that perform at least one of i) stripping color information from the unidirectional stream of Internet Protocol television data packets to reduce the bit rate and ii) stripping audio information from the unidirectional stream of Internet Protocol television data packets to reduce bit rate.

14. A computer program product according to claim 10, wherein the metering application includes instructions that classify according to:
- the end user's abuse of network privileges, wherein a history of bad behavior, such as spamming activity, influences the frequency of enforcement of the rate limit; and
- the end user's history of excessive bit rate requests, wherein a history of repeated requests for data that exceed the maximum bit rate influences the frequency of enforcement of the rate limit.

* * * * *